Figure 3:
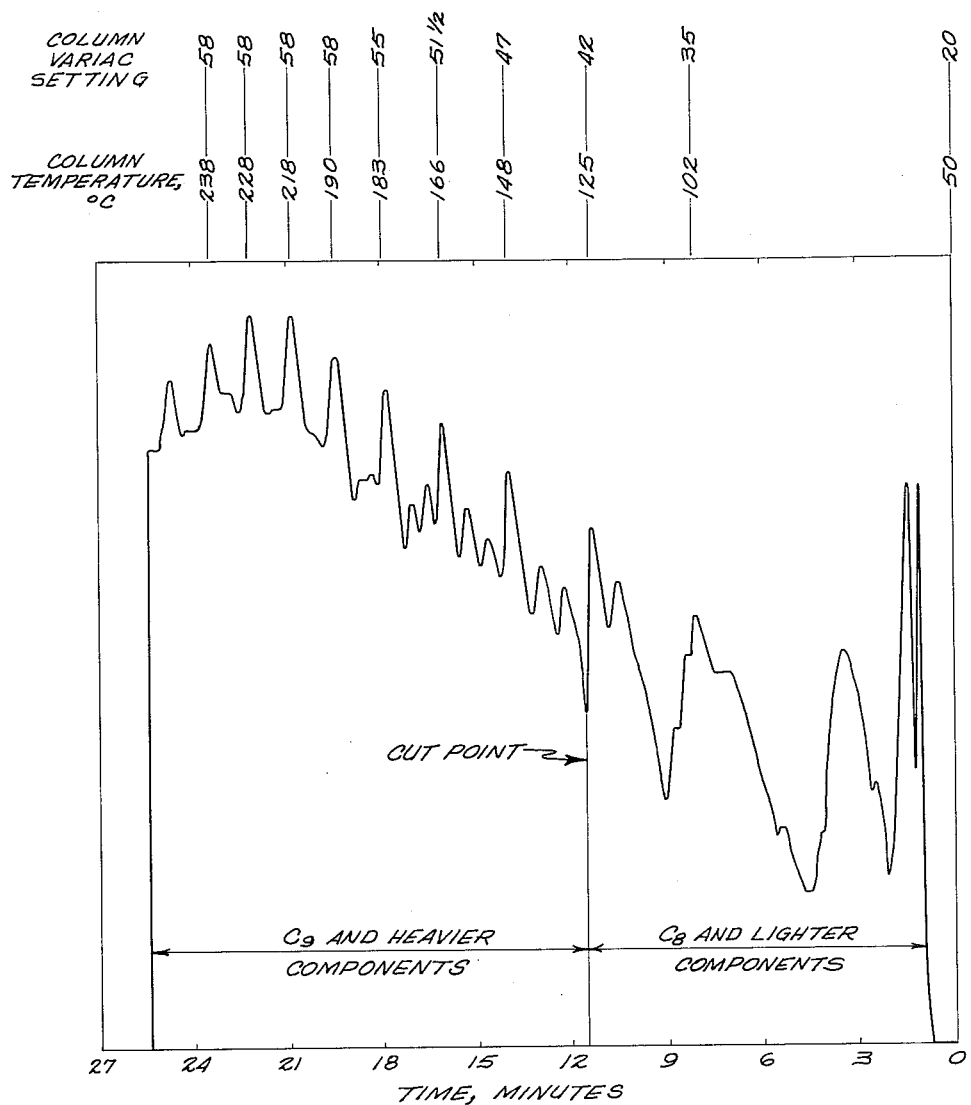

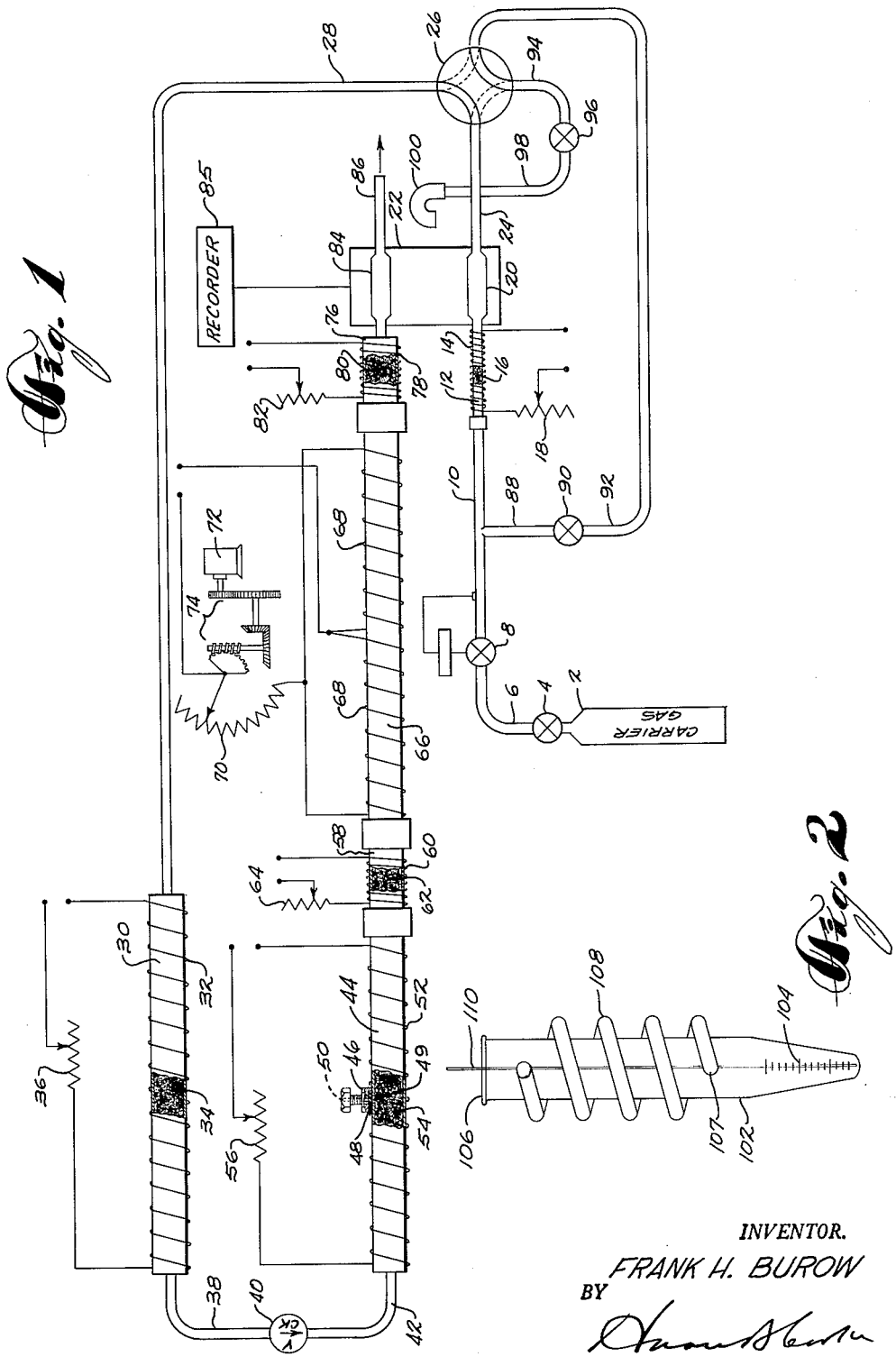

INVENTOR.
FRANK H. BUROW
BY
ATTORNEY

3,225,520
SAMPLE PREPARATION AND COLLECTION MEANS FOR GAS CHROMATOGRAPHIC COLUMNS
Frank H. Burow, Cheswick, Pa., assignor to Gulf Research & Development Company, Pittsburgh, Pa., a corporation of Delaware
Filed June 4, 1962, Ser. No. 199,882
8 Claims. (Cl. 55—67)

This invention relates to a chromatographic method and apparatus for separating wide boiling range, fluid mixtures containing a plurality of close boiling components, and more particularly to a chromatographic method and apparatus characterized by novel preparation of the sample to be separated and novel apparatus for effecting such preparation.

In the characterization of broad boiling range, fluid mixtures, e.g., crude petroleum, gasoline, naphtha and the like, it is frequently desired to separate such mixtures into smaller groups of components which can then be subjected to appropriate analytical methods, for example, in the characterization of a crude oil it may be desired to separate the lowest boiling components, for which detailed chromatographic calibration information is available, from the higher boiling components, for which no such information is available, and to separate intermediate boiling components from higher boiling components for detailed analysis by other appropriate methods, for example, mass spectrometry. In effecting such separations it is important that the separated component groups be distinct from one another, as the detailed analysis of the separated groups of components is complicated by overlapping of components in the separated component groups. Thus, the detailed chromatographic analysis of a fraction containing $C_8$ and lighter petroleum hydrocarbons may require several times as much analysis time when a small amount of higher boiling material is present than when only $C_8$ and lighter components are present. As only the $C_8$ and lighter fraction can be resolved into individual components, a complete quantitative analysis of this fraction cannot be obtained if part of a $C_8$ component remains in the heavier fraction where it cannot be quantitatively determined. Fractional distillation, even when highly efficient, is impractical for distinct separations of the kind desired for analytical purposes, because the closeness of the boiling points of the components comprising the fluid mixture and the countercurrent flow of liquid and vapors in the fractionating column prevent sharp separation of components. To illustrate, the careful fractionation of a naphtha sample in a highly efficient laboratory fractional distillation column having a length of nine feet, a diameter of one inch, and the equivalent of 200 theoretical plates, required a period of 405 hours to complete, and more than 100 cuts boiling at different temperatures were obtained. Even so, much overlapping occurred. For example, approximately 30 of the cuts were found to contain $C_8$ hydrocarbons. Similar difficulties are encountered with each cut point in the fractionation of more complex mixtures such as petroleum crude oils.

While separations sufficiently distinct for analytical purposes are achievable by gas chromatography using minute samples of the fluid mixtures, difficulties are encountered when samples are utilized of a size sufficient for further operations (e.g., chemical analysis) which require relatively large quantities. This is because relatively larger diameter chromatography separating columns and relatively larger carrier gas flow rates ordinarily are required with large fluid mixture samples in order to obtain the desired resolution. However, large diameter chromatographic separating columns are less efficient because of channeling of carrier gas flow and because of the increase in random flow of the mixture components in the column. Also, the relatively greater carrier gas flow rates required in larger columns interfere with the collection and recovery of separated components, as the components must be condensed out of the hot carrier gas. The increased velocity and quantity of the hot carrier gas hinder the complete condensation and recovery of the components.

The present invention relates to a chromatographic method and apparatus for effecting a distinct separation of a difficultly separable, wide-boiling range fluid mixture containing a plurality of close boiling components in a small diameter separating column, where the sample size is sufficient to permit physical recovery of separate portions of the mixture of a size suitable for analysis by appropriate analytical methods, and with essentially complete recovery of the fluid mixture sample. Broadly, in accordance with the method of this invention a sample of the fluid mixture to be separated is prepared for introduction into a chromatographic separating zone by heating a confined gas- and liquid-permeable mass of an inert material having an extensive surface area and having thermal conductivity characteristics in the range of metals and alloys, to a temperature sufficient to promote vaporization of vaporizable components of the sample, establishing a flow of carrier gas, preferably preheated, through the aforesaid heated mass, and injecting the fluid mixture sample into such mass. Components of the fluid mixture sample are removed from the heated gas- and liquid-permeable mass in partly separated form by continuing the flow of carrier gas therethrough. A further separation of such components into distinct portions is effected by introducing the effluent from the gas- and liquid-permeable mass into a chromatographic separating zone. The components of the mixture are then removed from the chromatographic separating zone in separated form by flushing said separating zone with carrier gas, and elution of heavier components is accelerated by gradually increasing the temperature of the chromatographic separating zone during such flushing. Separated components of the fluid mixture are separately recovered as desired from the effluent carrier gas as it emerges from the chromatographic separating zone. The method of this invention also includes as a novel subcombination the improved method of preparing the fluid mixture sample for introduction into the chromatographic separating zone.

The apparatus of this invention includes a sample flash chamber for preparing a sample of a fluid mixture to be separated for introduction into a chromatographic separating column, which flash chamber comprises a laterally closed conduit member defining a path of carrier gas flow from an inlet orifice to an outlet orifice, said conduit member containing a gas- and liquid-permeable packing formed from an inert material having extensive surface area and having thermal conductivity characteristics in the range of metals and alloys. The apparatus also includes heating means for heating said conduit member and said packing, and means upstream of the outlet orifice affording access to the interior of the flash chamber and for introducing the fluid mixture sample to be separated into said packing. The apparatus of this invention further includes a chromatographic separating column having an inlet and an outlet, together with means connecting the inlet of said column to the outlet of said flash chamber, and means for gradually raising the temperature of said chromatographic separating column. The present invention also embraces combinations of the above-indicated apparatus that include carrier gas preheating means positioned upstream of the flash chamber inlet, detecting means for sensing changes in the composition of the effluent from the chromatographic separating column, and/or means for recovering separated components from the effluent carrier gas from the chromatographic separating column, as well as novel subcombinations of the above-indicated apparatus combinations.

Referring briefly to the drawings, FIGURE 1 is a schematic representation of one suitable apparatus embodiment of this invention in which the hereindescribed method can be carried out. FIGURE 2 is a front elevation of a condensing trap structure useful in recovering separated components separated in accordance with the method and apparatus of this invention. FIGURE 3 is a reproduction of a recording chart of the type obtainable by the apparatus of FIGURE 1 when operated in accordance with the method of this invention, and showing a chromatogram, that is, a plot of the differential change in detector signal strength with respect to elapsed time for two low boiling cuts separated from a crude oil in accordance with the present invention.

The present invention can be most readily understood with detailed reference to FIGURE 1. Thus, numeral 2 in FIGURE 1 designates a carrier gas source, which may conveniently comprise a pressurized cylinder containing liquefied helium gas. It will be understood that other suitable eluent fluids can be employed as a carrier gas in the present invention with good results. In every instance, the carrier gas should be a material that is less strongly held by the stationary phase in the chromatographic separating column that any of the components of the fluid mixture that is to be subjected to analysis. Helium is especially advantageous as a carrier gas when a detector utilizing the principle of thermal conductivity is employed, as this gas has a thermal conductivity considerably higher than any of the components of the particular fluid mixtures disclosed herein. However, other gases, such as argon and nitrogen can be employed in appropriate instances. Numeral 4 in FIGURE 1 indicates the carrier gas cylinder valve and pressure regulator. Numeral 8 represents a flow controller for establishing a constant rate of flow of carrier gas into and through the system. Numerals 6 and 10 comprise conduit means defining a path of carrier gas flow and connecting carrier gas cylinder 2 with a heat exchanger 12.

Heat exchanger 12 comprises means for heating the carrier gas, prior to flow through the reference cell 20 of a thermal conductivity detector 22, to a temperature comparable to that of the effluent from the heat exchanger 76, which is passed through the other cell 84 of detector 22, so as to minimize baseline drift in the chromatogram recorded by recorder 85. Heat exchanger 12 includes a gas permeable packing 16 formed from a discrete corrosion resistant material having extensive surface area and thermal conductivity characteristics equivalent to those of metals and alloys, resistance heating windings 14, and a variable resistance 18 for controlling the electrical current input—and thus the heat output—of resistance windings 14.

Numerals 24, 26, and 28 denote conduit means, valve means, and conduit means, respectively, defining a path of flow for the carrier gas and connecting the reference cell 20 of thermal conductivity detector 22 with the inlet of carrier gas preheater 30.

Preheater 30 comprises means for preheating the carrier gas prior to admixing thereof with the fluid mixture sample to be analyzed, and, like heat exchanger 12, includes a packing 34 formed from a corrosion resistant material having extensive surface area and good thermal conductivity characteristics, resistance heating windings 32, and a variable resistance 36 for controlling the electrical current input and thus the heat output of resistance windings 32. Preheating of the carrier gas is desirable in order to promote vaporization of the vaporizable components of the fluid mixture to be analyzed and also in order to establish a temperature gradient in the chromatographic separating column 66. This temperature gradient is effected by transfer of heat from the carrier gas to the column packing.

The temperature at which the carrier gas preheater is operated can be any temperature that will promote vaporization of the vaporizable components of the fluid mixture to be analyzed and that will not cause decomposition of such components. Preferably, the temperature of the carrier gas preheater will not be significantly lower than that of the flash chamber 44 positioned downstream thereof so as to avoid any cooling effect on the latter. However, the temperature of carrier gas preheater 30 can be greater than that of flash chamber 44, within the limits indicated. In fact, this procedure can be advantageous in the case of fluid mixtures containing relatively large proportions of vaporizable materials, so as to minimize localized temperature reduction in the flash chamber 44 as a result of injection of the fluid mixture sample.

The outlet of carrier gas preheater 30 is connected by conduit 38, check valve 40 and conduit 42 to the inlet of a sample flash chamber 44, which constitutes means for vaporizing at least a portion of the fluid mixture to be separated. Like carrier gas preheater 30 and heat exchanger 12, flash chamber 44 is provided with a gas- and liquid-permeable packing 54 formed from a corrosion resistant, discrete material, having extensive surface area and having good thermal conductivity characteristics. Flash chamber 30 is also provided with resistance heating windings 52 whose heat output is controlled by a variable resistance 56. Flash chamber 44 is still further provided with gas- and liquid-tight means 46 affording access to packing 54 and permitting introduction of sample into packing 54 upstream of the flash chamber discharge outlet. Means 46 comprises a housing adapted to maintain a puncturable, silicone rubber diaphragm 48 in gas- and liquid-tight contact with the surface of tubular flash chamber 44 in the immediate vicinity of an aperture 49, thus providing access to the interior of flash chamber 44. Access means 46 is also provided with an annular passage 50 of small diameter, indicated by dotted lines, permitting access to diaphragm 48 by conventional sample-introducing means, not shown. The packing material on the upstream side of aperture 49 and check valve 40 constitute means positioned upstream of means 46 for preventing backflow of the fluid mixture sample.

The packing material 54, as well as packings 16, 34, 62, and 80 can be any material having extensive surface area and good thermal conductivity characteristics and that is inert with respect to the carrier gas and the components of the fluid mixture to be separated. It is preferred that the packing be formed from a metal or alloy that is inert to the carrier gas and the components of the fluid mixture to be separated because of the relatively high thermal conductivities possessed by metals and alloys, but this is not absolutely necessary, as other inert materials having equivalent thermal conductivities, for example, high thermal conductivity graphites, can be used. The thermal conductivities of a number of metals and alloys are indicated in Perry's Chemical Engineers Handbook, third edition, page 456, and in Lange's Handbook of Chemistry, fourth edition, at pages 1340 and 1341. The packing material can be in discrete form, or alternatively, it can be in integral form, as in the case of a sintered material, provided the surface area remains extensive. In general, the same considerations that apply to the selection of packing material sizes for packed gas desorption columns or packed distillation columns of equivalent diameter apply to the selection of the packing material for the sample flash chamber. Thus, the smaller the size of the packing material the shorter the length of the flash chamber required to produce equivalent results, provided that the particle size is not so small as to interfere with distribution of liquid components of the fluid mixture over the entire cross-section of the flash chamber. Packings capable of promoting continuous film-type flow over extensive surface without drop formation are considered good. In this connection, stainless steel turnings or shavings in the form of loose spirals and having a diameter in the range of perhaps 0.05 to 0.1 cm., compacted tightly in the heat exchange chamber have been found to produce good results, but packing materials having other geometric forms can be used. For example, there can be used commercial wire column packings marketed under the name of Heli-Pac, Podbielniak Double Spirals, Fenske Spirals, and the like. Similarly, materials other than stainless steel can be employed. For example, there can be used packings formed from corrosion resistant alloys such as Constantan (copper-nickel alloy), Monel Metals (high nickel-copper alloys), Chromel (nickel-chromium alloy), Alumel (a high nickel alloy), and noble metals.

The temperature at which the flash chamber is maintained will depend upon the nature of the fluid mixture to be separated. Any temperature can be used that will promote vaporization of the vaporizable components of the fluid mixture without decomposing such components. In the interest of promoting reasonably rapid vaporization, the temperature to which the flash chamber is heated preferably will be in the range of about the 50 percent and the 90 percent distillation points for the vaporizable portion of the fluid mixture. For example, the highest temperature to which a crude petroleum oil can be safely heated without cracking is normally considered to be about 600° to 650° F. (approximately 315° to 345° C.). Accordingly, where the fluid mixture to be separated is a crude petroleum oil, it is preferred that the flash chamber temperature be maintained in the range of the temperatures required to distill from 50 percent to 90 percent of the material boiling below the cracking temperature. Thus, for a crude petroleum oil, flash chamber temperatures in the range of about 200° to 300° C. are suitable. On the other hand, for gasoline and naphtha mixtures, flash chamber temperatures in the range of about 105° to 200° C. are suitable. In all instances temperatures that do not unduly shorten the life of disc 48 are preferred.

Numeral 58 denotes a column heat exchanger whose inlet is connected to the outlet of flash chamber 44. Like flash chamber 44, preheater 30, and heat exchanger 16, heat exchanger 58 includes gas- and liquid-permeable corrosion resistant packing formed from a discrete material having extensive surface area and good thermal conductivity characteristics, resistance heating windings 60, and a variable resistance 64 for controlling the electrical current input—and thus the heat output—from resistance winding 60. Column heat exchanger 58 is employed primarily to insure removal in vapor form of fluid mixture components backflushed from chromatographic column 66. During forward flow of carrier gas into the chromatographic separating column, the column heat exchanger merely serves as an extension of flash chamber 44. The temperature at which column heat exchanger 58 is maintained will be governed by the same considerations as those governing the temperature at which flash chamber 44 is operated.

Numeral 66 denotes a chromatographic separating column, the inlet of which is connected to the outlet of flash chamber 44 by way of column heat exchanger 58. Separating column 66 is provided with resistance heating windings 68, whose heat outputs are controlled by variable resistance 70. Numerals 72 and 74 refer, respectively, to drive means and a gear train for gradually advancing the output voltage (and thus the temperature of column 66) of variable resistance 70.

In a preferred embodiment column 66 is a packed, gas-liquid partition chromatographic separating column, and as such, will be packed with particles of an inert solid provided with a coating of a liquid or semi-liquid material suitable for the particular fluid mixture undergoing separation. Celite-type kieselguhr and insulating brick made from the same material of a particle size between about 30 and 100 mesh, preferably between about 30 and 60 mesh, are examples of suitable inert supporting materials for use in packed partition columns. A wide variety of liquid materials can be used as the stationary phase material in chromatographic partition columns. When the columns are subjected to elevated temperatures, as disclosed herein, liquid materials of low volatility (high boiling point) are preferred as the stationary phase material. An example of a liquid or semi-liquid material suitable for use in partition columns useful in the present invention for separation at temperatures below about 250° C. is silicone gum or rubber. Other suitable materials are silicone oils such as General Electric Company SF-96 (1000) silicone oil, which is useful at temperatures in the range of 0° C. to 250° C., and silicone gums such as General Electric Company SE-30 silicone gum, which is useful at temperatures as high as 300° C. Still other examples of suitable materials are polyethylene, squalane, and paraffin wax. Although partition columns are preferred for the separation of hydrocarbon mixtures such as crude oil, gasoline, naphtha and the like, it will be understood that insofar as the principles of the invention are concerned, the chromatographic separating columns employed can be adsorption columns. In such instances, separation of mixtures occurs as a result of differential adsorption of the components of the mixture subjected to analysis on the surfaces of an inert, porous adsorptive solid employed as the column packing. Examples of suitable adsorption column packings include diatomaceous earth, silica gel, and activated charcoal, each having a bulk density less than 0.4 gram per ml. and a particle size in the range mentioned above.

Numeral 76 constitutes means for heating the effluent from the chromatographic separating column 66 to the desired controlled temperature prior to introducing the same into the cell 84 of thermal conductivity detector 22. Heat exchanger 76, similarly as heat exchanger 12, carrier gas preheater 30, flash chamber 44, and column heat exchanger 58 is provided with a gas- and liquid-permeable corrosion resistant packing formed from discrete material having extensive surface area and good thermal conductivity characteristics, and with resistance windings 78, whose heat output is controlled by variable resistance 82. Thermal conductivity detector 22 comprises means for sensing changes in the composition of the effluent from separating column 66. Any suitable detecting device can be used that is capable of utilizing some property of the detected component to create a signal, usually an electric current, proportional to the concentration of that component in the effluent. Good results are obtainable by the use of conventional thermal conductivity detector cells, as in the illustrated embodiment, but other detectors responsive to changes in the composition of the effluent gas, including gas density balances, and radiological ionization detectors can be used. Of course, if a detector that is destructive to the detected components is employed, the effluent stream of separated components should be split, with one branch being directed to the detector and the other to suitable collecting means.

Numeral 85 denotes recording means associated with detector 22 for indicating the differential variation in effluent composition with respect to time, detected by means 22. Recorder 85 functions simply by converting the varying electrical ouput of detector 22 to reciprocating mechanical motion by recorder pen drive means, whereby a recording pen is caused to move relative to the surface of a recording chart that advances at a predetermined rate.

Numeral 86 denotes conduit means connecting the outlet of detector cell 84 with means, not shown, for separately recovering components separated in the chromatographic separating column 66. In a preferred embodiment the recovery means includes a trap condenser constructed in accordance with the structure shown in FIGURE 2.

Referring briefly to FIGURE 2, numeral 102 denotes a transparent glass vessel provided with volumetric graduations 104 in a lower, condensate-collecting section, which is spaced apart from an inlet 106 positioned at the upper end of vessel 102 and a vapor outlet 107 positioned intermediately of said inlet and said condensate-collecting section, said outlet being connected to upwardly inclined outlet conduit 108. The condensing trap is also provided with a member 110 having dimensions and form such as to permit it to extend from the inlet of the trap to the lower portion thereof, said member being formed from a wire or rod of a corrosion resistant metal or alloy, such as the metals and alloys described previously. In connecting trap 102 to the outlet of line 86, wire 110 is conveniently contacted with line 86 to provide good thermal transfer between the hot conduit and wire 110. Member 110, by some mechanism not entirely understood, serves to improve recovery of separated components from the effluent carrier gas by avoiding, in the main, fog formation in the condensing trap 102.

Referring again to FIGURE 1, conduits 88 and 92, together with valve means 90 and 26, constitute a parallel path of carrier gas flow into carrier gas conduit 28. Conduits 94, 98, and flexible conduit 100, together with value means 96 and 26 constitute means for backflushing chromatographic separating column 66 by directing flow of carrier gas from carrier gas conduit 24 into conduit 86 at appropriate times.

In operation of the apparatus illustrated in FIGURE 1, variable resistances 18, 36, 56, 64, and 82 are set to provide the desired heat output in resistance windings 14, 32, 52, 60, and 78, respectively, and valves 4 and 8 are set to provide a constant carrier gas flow at the desired rate through lines 10, 28, 38, and 42 and flash chamber 44 and columns 66. After the heat exchanger 12, carrier gas preheater 30 and flash chamber 44 have reached a predetermined temperature, sufficient to promote vaporization of the vaporizable components of the fluid mixture to be separated as indicated by thermocouples, not shown, attached thereto, a sample of a fluid mixture to be separated, for example, a crude petroleum oil, having a volume of about 10 ml. is introduced into the packing of flash chamber 44 through means 46, by the use of a hypodermic syringe, not shown. The lighter components of the crude oil sample are quickly vaporized and swept through the packing 54 of flash chamber 44 by means of the flowing stream of carrier gas. The components of the crude oil sample that are not immediately vaporized are distributed as a liquid film over the surfaces of the packing 54 a slight distance downstream and a slight distance upstream of orifice 49. By dismantling the flash chamber immediately after injection of a 10 ml. sample of crude oil of which 25 percent was unvaporizable, it has been found that when using stainless steel metal shavings in a flash chamber having an internal diameter of approximately 5/8 inch, the metal shavings being packed to a density of approximately 8 grams per inch of flash chamber length, the unvaporized components of the sample will be distributed approximately one inch upstream and downstream of orifice 49. It is important that the unvaporized components not be distributed over a great length of the flash chamber, particularly upstream, as such procedure will result in lighter components following heavier components into the chromatographic separating column, whereby the column length required to effect resolution of components is substantially increased. In the embodiment illustrated the packing upstream of orifice 49 is sufficient of itself to prevent backflow of the unvaporized components of the sample, and check valve 40 merely acts as a safeguard. When a check valve alone is provided in lieu of dense packing 54 upstream of orifice 49, and the fluid mixture to be separated is a crude petroleum oil, there may be a tendency for the check valve to stick as a result of the tarry residue remaining after vaporization of the vaporizable components of the sample. However, the check valve alone can suffice to prevent backflow of sample where the fluid mixture to be separated contains no viscous or tarry residue, as in the case of gasoline or naphtha.

Following injection of the sample into the flash chamber and vaporization by hot carrier gas of the easily vaporizable components, a rough separation of such components is effected when the carrier gas carries the sample through the packing 54 of the flash chamber 44 downstream of orifice 49. As a consequence of the multiplicity of small diameter, tortuous passageways provided by the packing, the distribution of unvaporized components as a film over extensive surface area, and as a result of the differences in volatility and diffusivity of the individual vaporized components, the less easily vaporizable components of the sample follow the more easily vaporizable components in the order in which they are vaporized and undergo a similar rough separation by passage through the packing material 54 downstream of orifice 49.

The rough separation of the sample components effected in flash chamber 44 is important in the present invention in that this separation permits the sample components to be introduced into the chromatographic separating column by increments, whereby choking or flooding of the small diameter column is avoided, notwithstanding the unusually large size of the sample, and whereby remarkably good resolution of components can be obtained with small column length.

As the effluent from the flash chamber 44 enters chromatographic separating column 66, a downward temperature gradient will be encountered in the packing, which gradient will have developed by virtue of the gradual loss of heat from the preheated carrier gas to the column packing during initial passage therethrough. The downward temperature gradient in the chromatographic separating column also contributes to the beneficial results of the invention in that such temperature gradient further promotes spreading out of the sample along a relatively greater length of the column. The column temperature gradient functions to distribute the sample by virtue of the fact that the gradual drop in temperature encountered by the sample components as they enter the column and advance therethrough slows the rate of advance of the heavier components much more greatly than the lighter components.

Having introduced all of the components of the fluid mixture sample that are vaporizable at the flash chamber temperature employed into the chromatographic separating column 66 without choking of the column, it might be possible to effect the desired resolution of the sample simply by continuing to pass carrier gas through the chromatographic separating column until all of the products were eluted, provided that the column was of sufficient length in the first instance. However, in the instance of a wide boiling range mixture containing close boiling components, as here, the time required for complete elution of the heaviest components introduced into the column would be prohibitively great. In order to accelerate elution of the heaviest components from the chromatographic separating column, the temperature of the column is gradually increased during elution of the components. The desired rate of advance of the column temperature is provided by variable resistance 70, motor 72, and gear train 74. The gradual increase of the column temperature is conveniently commenced approximately concurrently with introduction of the sample, by setting variable resistance 70 at the desired starting output voltage, and starting the motor 72.

The separated components pass out of the column 66 in the order of their separation into heat exchanger 76 where they are raised to a predetermined constant temperature prior to introduction into the detector cell 84 of thermal conductivity detector 22. The variations in the effluent composition are detected in cell 84 and recorded by recorder 85. The separated components are then recovered from the effluent gas by condensation and trapping out in a refrigerated trap such as that shown in FIGURE 2. Refrigeration of the trap can be provided by any convenient cooling means, such as a vessel containing a cooling slurry of Dry Ice and a solvent like trichloroethylene. The separated components of the mixture flow in vapor form downwardly into trap 102, where the cooled surface of the condenser causes condensation of the condensible components, which then collect in the graduated portion of the trap. The uncondensed carrier gas passes out of the trap by way of outlet 107 and upwardly through inclined discharge conduit 108. Any traces of uncondensed sample components remaining in the carrier gas will be condensed in outlet conduit 108 and will flow therefrom back into the lowest portion of trap 102. When the desired cut point is reached, as indicated by recorder 85, the condenser trap at the end of column 86 is switched or exchanged and collection of a new cut is begun.

After the desired number of cuts have been collected at outlet 86, valve 4 is shut off and the union between column heat exchanger 58 and flash chamber 44 is disconnected, flexible coupling 100 is connected to the end of conduit 86, valve 26 is switched to the alternate position, and valves 96 and 4 are opened. Under this arrangement preheated carrier gas is caused to flow from lines 10 and 24 through lines 94 and 98 and in a backward direction through column 66, whereby the column is backflushed to remove the heaviest components. A refrigerated trap like that shown in FIGURE 2 will be connected to the inlet of column heat exchanger 58, whereby the heaviest components in the column can be condensed, trapped and collected.

In instances where the flash chamber temperature is insufficient to remove all of the components of the sample residue that are vaporizable without decomposition, the flash chamber temperature can be raised to a higher degree and valve 90 opened, while the union between elements 44 and 58 is disconnected, whereupon a parallel flow of carrier gas is set up through line 92, valve 26, line 28, preheater 30, lines 38–42 and thence through the flash chamber. The residual components vaporized during the period can be collected by means of a trap like that in FIGURE 2 attached to the outlet of flash chamber 44.

The unvaporized residue of the sample is removed from the flash chamber by the use of a volatile solvent, and the residue is recovered from the solution for analysis by evaporation of solvent.

The thus-separated and collected cuts are then subjected to appropriate detailed analysis. For example, the light ends can be subjected to detailed chromatographic analysis in a capillary column, and heavier cuts can be subjected to further analysis by appropriate methods. For example, the saturated components of the $C_{9-10}$ and the $C_{11-20}$ cuts can be separated by fluorescent indicator adsorption, and the thus-separated fractions can be subjected to group analysis by low temperature and high temperature mass spectrometry. Also, densities, indices of refraction, and other physical constants can be taken on the various cuts and fractions thereof.

In a specific embodiment the carrier gas preheater was constructed of a two-foot length of ½-inch standard stainless steel pipe having an inside diameter of approximately ⅝-inch. The flash chamber was constructed of two lengths of ½-inch stainless steel pipe, an eight-inch length upstream, and a 16-inch length downstream of means 46. Each of these chambers was densely packed with stainless steel spirals of the kind described above, in a density corresponding to about eight grams of packing per inch of pipe length. Each chamber was wound with a total of about 30 feet of 20-gauge (B and S) asbestos-covered, Nichrome wire that had been threaded into a glass fabric insulating sleeve. All variable resistances employed in the apparatus were 7.5 ampere Variac rheostats having a graduated output voltage from 0 to 140. The chromatographic separating column and the heat exchangers preceding and following the same were formed from ¼-inch standard stainless steel pipe having an inside diameter of about 5/16-inch. The heat exchangers preceding and following the column were eight inches in length and were wound with 10 feet of 20-gauge Nichrome wire. The column itself was formed of ¼-inch stainless steel pipe four feet in length and was wound with two 30-foot lengths of 20-gauge Nichrome wire connected in parallel. The carrier gas heat exchanger 12 was formed from ¼-inch stainless steel tubing. This exchanger was densely packed with stainless steel spirals, as were the column heaters, the flash chamber, and the carrier gas preheater. The chromatographic separating column was packed with Johns-Manville C–22 Silocel crushed firebrick having a size of —30, +60 mesh, and having deposited thereon a silicone rubber gum (General Electric SE–30) in the amount of 20 percent by weight.

In starting up the apparatus, the carrier gas heat exchanger temperature was set at 290° C. The carrier gas preheater temperature was set at 275° C. The flash chamber temperature was set at 280° C. The first column heat exchanger was set at 290° C. The column temperature was programmed from 50° C. to 240° C. The column-cell heat exchanger 76 was set at 290° C., and the cell temperature was set at 290° C. At the time of sample injection, the column Variac output voltage was set at 20, and the Variac motor drive was switched on. A helium carrier gas flow of 100 cc. per minute was caused to flow through the system. The thermal conductivity cell filament current was 100 milliamperes, and a 100 millivolt recorder was connected to the thermal conductivity detector. After the system had reached the desired starting temperatures, a crude oil sample in the amount of 7.48 grams (approximately 10 cc. in volume) was injected into the flash chamber by means of a hypodermic syringe. Two cuts consisting of $C_8$ and lighter and $C_{9-16}$ hydrocarbons, respectively, corresponding to the cuts shown in FIGURE 3, were condensed and collected at the outlet of the detector cell. After collection of the $C_{9-16}$ cut, helium flow through the column was reversed and a $C_{17}$ and heavier cut was collected at the inlet of the column by backflushing. The unvaporized residue from the sample was recovered by disconnecting the flash chamber and washing the packing with methylene chloride, followed by evaporation of solvent. Recovery of the sample was 98.0 percent. The $C_8$ and lighter cut amounted to 12.5 percent by weight of the material recovered. The $C_{9-16}$ cut amounted to 32.4 percent. The $C_{17}$ and higher cut amounted to 29.6, and the unvaporized residue amounted to 25.5 percent. These cuts were then subjected to appropriate detailed analysis.

The herein-disclosed invention is not limited to separation of the lighter and heavier components of crude oils or to any particular operating conditions, as it also can be used to separate large-size samples of other wide boiling range mixtures containing close boiling components into two or more sharply defined groups of components. For example, the herein-disclosed invention can be used to separate gasoline, naphtha, jet fuel, and the like into the respective component groups contained therein for further detailed analysis by appropriate methods. Although the herein-disclosed invention is particularly adapted for separation of large-size samples, with physical recovery of separated components, the apparatus nevertheless can be used merely for analytical separation of conventional, small-size samples, with remarkably good resolution considering the relatively short column length. In addition, while the illustrated embodiment is adapted for manual sample introduction and manual initiation of the temperature program, it will be appreciated that the instrument can be partly or fully automated by the use of conventional automatic sample injection means, sequence controllers and the like.

I claim:

1. A chromatographic method for separating a normally liquid, wide boiling range mixture containing a plurality of close-boiling components, comprising preparing a sample of said mixture for introducing into a chromatographic separating zone by heating a tightly compacted, gas- and liquid-permeable mass of a material that is inert with respect to the sample mixture and having extensive surface area and having a thermal conductivity in the range of metals and alloys, said mass of material being confined within and substantially filling a sample vaporizing chamber that is elongated in the direction of carrier gas flow, said mass of material being heated to a temperature sufficient to promote gradual vaporization substantially in the order of decreasing volatility of the vaporizable components of the sample that are vaporizable at the conditions of the system, establishing a flow of carrier gas through said heated mass, and injecting said sample into said heated mass, vaporizing said vaporizable components in a succession of increments substantially in the order of decreasing volatility over a period of time such that each vaporized increment is swept by said carrier gas along the path of carrier gas flow at least some distance within said heated mass from the place of initial vaporization before vaporization of a subsequent increment, whereby a partial separation of said vaporizable components takes place within said heated mass, thereafter removing from said mass the gradually vaporized components of said sample in partly separated form substantially in the order which they have been vaporized by continuing the flow of carrier gas therethrough, effecting a further separation of such components into distinct portions by introducing the effluent from said mass into a chromatographic separating zone, and removing further separated components in separated form from the chromatographic separating zone by elution with said carrier gas, and accelerating elution of heavier components from said separating zone by gradually increasing the temperature of the chromatographic separating zone during elution with carrier gas, the volume of said chamber being at least about the volume of said chromatographic separating zone and substantially larger than the volume of said sample.

2. The method of claim 1 where the carrier gas is preheated prior to passage through said mass to a temperature sufficient to promote vaporization of the vaporizable components of the sample.

3. A chromatographic method for separating a normally liquid, wide boiling range mixture containing a plurality of close-boiling components, comprising preparing a sample of said mixture for introduction into a chromatographic separating zone by heating a tightly compacted, gas- and liquid-permeable mass of a material that is inert with respect to the sample mixture and having extensive surface area and having a thermal conductivity in the range of metals and alloys, said mass of material being confined within and substantially filling a sample vaporizing chamber that is elongated in the direction of carrier gas flow, said mass of material being heated to a temperature sufficient to promote gradual vaporization substantially in the order of decreasing volatility of the vaporizable components of the sample that are vaporizable at the conditions of the system, establishing a flow of carrier gas through said heated mass, and injecting said sample into said heated mass, vaporizing said vaporizable components in a succession of increments substantially in the order of decreasing volatility over a period of time such that each vaporized increment is swept by said carrier gas along the path of carrier gas flow at least some distance within said heated mass from the place of initial vaporization before vaporization of a subsequent increment, whereby a partial separation of said vaporizable components takes place within said heated mass, thereafter removing from said mass the gradually vaporized components of said sample in partly separated from substantially in the order in which they have been vaporized by continuing the flow of carrier gas therethrough, effecting a further separation of such components into distinct portions by introducing the effluent from said mass into a chromatographic separating zone, and removing further separated components in separated form from the chramotographic separating zone by form substantially in the order in which they have been elution with said carrier gas, accelerating elution of heavier components from said separating zone by gradually increasing the temperature of the chromatographic separating zone during elution with carrier gas, and separately recovering separated components from the effluent from said chromatographic separating zone, the volume of said chamber being at least about the volume of said chromatographic separating zone and substantially larger than the volume of said sample.

4. A chromatographic method for separating a normally liquid, wide boiling range mixture containing a plurality of close-boiling components, comprising preparing a sample of said mixture for introduction into a chromatographic separation zone by heating a tightly compacted, gas- and liquid-permeable mass of a material that is inert with respect to the sample mixture and having extensive surface area and having a thermal conductivity in the range of metals and alloys, said mass of material being confined within and substantially filling a sample vaporizing chamber that is elongated in the direction of carrier gas flow, said mass of material being heated to a temperature sufficient to promote gradual vaporization substantially in the order of decreasing volatility of the vaporizable components of the sample that are vaporizable at the conditions of the system, establishing a flow of carrier gas through said heated mass, and injecting said sample into said heated mass, vaporizing said vaporizable component in a succession of increments substantially in the order of decreasing volatility over a period of time such that each vaporized increment is swept by said carrier gas along the path of carrier gas flow at least some distance within said heated mass from the place of initial vaporization before vaporization of a subsequent increment, whereby a partial separation of said vaporizable components takes place within said heated mass, thereafter removing from said mass the gradual vaporized components of said sample in partly separated form substantially in the order in which they have been vaporized by continuing the flow of carrier gas therethrough, effecting a further separation of such components into distinct portions by introducing the effluent from said mass into a chromatographic separating zone, and removing further separated components in separated form from the chromatographic separating zone by elution with said carrier gas, accelerating elution of heavier components from said separating zone by gradually increasing the temperature of the chromatographic separating zone during elution with carrier gas, and removing the heaviest components in the chromatographic separating zone by backflushing said zone with carrier gas, the volume of said chamber being at least about the volume of said chromatographic separating zone and substantially larger than the volume of said sample.

5. A chromatographic method for separating a normally liquid, wide boiling range mixture containing a plurality of close-boiling components, comprising preparing a sample of said mixture for introduction into a chromatographic separation zone by heating a tightly compacted, gas- and liquid-permeable mass of a material that is inert with respect to the sample mixture and having extensive surface area and having a thermal conductivity in the range of metals and alloys, said mass of material being confined within and substantially filling a sample vaporizing chamber that is elongated in the direction of carrier gas flow, said mass of material being heated to a temperature sufficient to promote gradual vaporization substantially in the order of decreasing volatility of the vaporizable components of the sample that are vaporizable at the conditions of the system, establishing a flow of carrier gas through said heated mass, and injecting said sample into said heated mass, vaporizing said vaporizable components in a succession of increments substantially in the order of decreasing volatility over a period of time such that each vaporized increment is swept by said carrier gas along the path of carrier gas flow at least some distance within said heated mass from the place of initial vaporization before vaporization of a subsequent increment, whereby a partial separation of said vaporizable components takes place within said heated mass, thereafter removing from said mass the gradually vaporized components of said sample in partly separated form substantially in the order in which they have been vaporized by continuing the flow of carrier gas therethrough, effecting a further separation of such components into distinct portions by introducing the effluent from said mass into a chromatographic separating zone, and removing further separated components in separated form from the chromatographic separating zone by elution with said carrier gas, accelerating elution of heavier components from said separating zone by gradually increasing the temperature of the chromatographic separating zone during elution with carrier gas, removing the heaviest components from the chromatographic separating zone by backflushing said zone with carrier gas, and removing unvaporized residue from said mass by washing said mass with a volatile solvent for such residue, the volume of said chamber being at least about the volume of said chromatographic separating zone and substantially larger than the volume of said sample.

6. A chromatographic method for separating a normally liquid, wide boiling range mixture containing a plurality of close-boiling components, comprising preparing a sample of said mixture for introduction into a chromatographic separating zone by heating a tightly compacted, gas- and liquid-permeable mass of a material that is inert with respect to said sample mixture, that has extensive surface area, and that has a thermal conductivity in the range of metals and alloys, said mass of material being confined within and substantially filling a sample vaporizing chamber that is elongated in the direction of carrier gas flow, said mass of material being heated to a temperature sufficient to promote rapid vaporization of lower boiling components of the sample and to promote gradual vaporization, substantially in the order of decreasing volatility, of the higher boiling components of the sample that are vaporizable at the conditions of the system, establishing a flow of carrier gas through said heated mass, and injecting said sample into said heated mass, vaporizing said vaporable higher boiling components in a succession of increments substantially in the order of decreasing volatility over a period of time such that each vaporized increment is swept by said carrier gas along the path of carrier gas flow within said heated mass at least some distance from the place of initial vaporization before the next increment is vaporized, whereby a partial separation of said vaporizable higher boiling components takes place within said heated mass, removing from said mass the rapidly vaporized components of said sample and thereafter removing from said mass the gradually vaporized components of said sample in partly separated form, substantially in the order of vaporization, by continuing the flow of carrier gas therethrough, effecting a further separation of such components into distinct portions by introducing the effluent from said mass into a chromatographic separating zone, and removing further separated components in separated form from the chromatographic separating zone by elution with said carrier gas, and accelerating elution of heavier components from said separating zone by gradually increasing the temperature of the chromatographic separating zone during elution with carrier gas, the volume of said chamber being at least about the volume of said chromatographic separating zone and substantially larger than the volume of said sample.

7. A chromatographic method for separating a normally liquid, wide boiling range mixture containing a plurality of close-boiling components, comprising preparing a sample of said mixture for introduction into a chromatographic separating zone by heating a tightly compacted, gas- and liquid-permeable mass of a material that is inert with respect to said sample mixture, that has extensive surface area, and that has a thermal conductivity in the range of metals and alloys, said mass of material being confined within and substantially filling a sample vaporizing chamber that is elongated in the direction of carrier gas flow, said mass of material being heated to a temperature sufficient to promote rapid vaporization of lower boiling components of the sample and to promote gradual vaporization, substantially in the order of decreasing volatility, of the higher boiling components of the sample that are vaporizable at the conditions of the system, said temperature being in the range of about the 50 percent and the 90 percent distillation points for the portion of the sample mixture that is capable of being vaporized at the conditions of the system, establishing a flow of carrier gas through said heated mass, and injecting said sample into said heated mass, vaporizing said vaporable higher boiling components in a succession of increments substantially in the order of decreasing volatility over a period of time such that each vaporized increment is swept by said carrier gas along the path of carrier gas flow within said heated mass at least some distance from the place of initial vaporization before the next increment is vaporized, whereby a partial separation of said vaporizable higher boiling components takes place within said heated mass, removing from said mass the rapidly vaporized components of said sample and thereafter removing from said mass the gradually vaporized components of said sample in partly separated form, substantially in the order of vaporization, by continuing the flow of carrier gas therethrough, effecting a further separation of such components into distinct portions by introducing the efflent from said mass into a chromatographic separating zone, and removing further separated components in separated form from the chromatographic separating zone by elution with said carrier gas, and accelerating elution of heavier components from said separating zone by gradually increasing the temperature of the chromatographic separating zone during elution with carrier gas, the volume of said chamber being at least about the volume of said chromatographic separating zone and substantially larger than the volume of said sample.

8. A chromatographic separating apparatus for separation of relatively large size samples of normally liquid, wide boiling range mixtures, comprising a sample flash chamber formed by a laterally closed conduit defining a path of carrier gas flow from an inlet orifice to an outlet orifice, said conduit being elongated in the direction of carrier gas flow and substantially filled with a tightly compacted gas-and liquid-permeable packing form from a material that is inert with respect to the components of a fluid mixture to be separated, that has extensive surface area, and that has a thermal conductivity in the range of metals and alloys, the length of said conduit being sufficient to permit displacement within said conduit of vaporized increments of the fluid mixture by carrier gas along the path of carrier gas flow prior to vaporization of further increments of said fluid mixture, heating means for heating said conduit and said packing to a temperature sufficient to promote rapid vaporization of lower boiling components of said fluid mixture and to promote gradual vaporization in the presence of flowing carrier gas, substantially in the order of decreasing volatility, of higher boiling components of said fluid mixture, means upstream of said outlet orifice affording access to the interior of said flash chamber for introducing a sample of the fluid mixture said packing, a chromatographic separating column having an inlet and an outlet, means fluidly communicating the inlet of said chromatographic separating column with the outlet of said flash chamber, and means for gradually raising the temperature of said chromatographic separating column, the volume of said flash chamber being at least about the volume of said chromatographic separating column and substantially larger than the volumn of said sample.

References Cited by the Examiner

UNITED STATES PATENTS

| | | | |
|---|---|---|---|
| 1,957,006 | 5/1934 | Wescott | 55—27 |
| 2,095,578 | 10/1937 | Theiler | 202—48 |
| 2,398,817 | 4/1946 | Turner | 55—67 X |
| 2,399,095 | 4/1946 | Burrell et al. | 55—67 X |
| 2,522,529 | 9/1950 | Miller et al. | 202—47 |
| 2,659,452 | 11/1953 | Gaydasch | 55—418 X |
| 2,943,702 | 7/1960 | Hudson et al. | 55—67 |
| 2,991,647 | 7/1961 | Harris. | |
| 3,002,583 | 10/1961 | Findlay | 55—67 X |
| 3,030,798 | 4/1962 | Lichtenfels | 55—67 X |
| 3,032,953 | 5/1962 | Micheletti | 55—197 X |
| 3,043,127 | 7/1962 | DeFord et al. | 55—67 X |
| 3,043,128 | 7/1962 | Ayers. | |
| 3,053,077 | 9/1962 | Tracht | 55—386 |
| 3,057,692 | 10/1962 | Kirk et al. | 55—67 X |
| 3,062,038 | 11/1962 | Ayres. | |
| 3,063,286 | 11/1962 | Nerheim. | |

FOREIGN PATENTS

| | | |
|---|---|---|
| 682,392 | 11/1952 | Great Britain. |
| 783,713 | 9/1957 | Great Britain. |
| 812,538 | 4/1959 | Great Britain. |

OTHER REFERENCES

Bradley et al.: "The Determination of Chloroform in Aqueous Pharmaceutical Preparations," The Analyst, vol. 84, No. 997, April 1959, pp. 222.

Strassburger et al.: "Analysis of Methyl Methacrylate Copolymers by Gas Chromatography," Analytical Chemistry, vol. 32, No. 4, April 1960, pp. 454–455.

Burrell Instruments: Catalog 84, Burrell Corporation, 2223 5th Ave., Pittsburgh 19, Pa. Received in Patent Office September 17, 1959, pp. 42, 44.

Strain, H. H.: Chromatographic Adsorption Analysis, Interscience Publishers Inc., New York, N.Y., 1942, pp. 32, 38.

Szmanski, H. A.: (Edition), Lectures on Gas Chromatography, April 23–26, 1962, Plenum Press, New York, N.Y. 1963, pp. 250, 251.

Swinnerton et al.: "Determination of Dissolved Gases in Aqueous Solutions by Gas Chromatography," Analytical Chemistry, vol. 34, No. 4, April 1962, pp. 483, 484.

Zechmeister et al.: Principles and Practice of Chromatory, John Wiley & Sons, Inc., 440 4th Ave., New York, N. Y., 1941, pp. 66.

Nogare et al.: "Programmed Temperature Gas Chromatory," Analytical Chemistry, vol. 32, No. 7, June 1960, pp. 767– 770.

Giddings: "Optimum Conditions for Separation in Gas Chromatography," Analytical Chemistry, vol. 32 No. 12, November 1960, pp. 1707–1711.

Habgood et al.: "Retention Temperature and Column Efficiency in Programmed Temperature Gas Chromatography," Analytical Chemistry, vol. 32, No. 4, April 1960.

Bradford et al.: "The Chromatographic Analysis of Hydrocarbon Mixtures," Journal of Institute of Petroleum, vol. 41, 1955, pp. 80–91.

Dannley et al.: "Simplified Apparatus for Backwashing Chromatographic Columns With Inert Solvents," Analytical Chemistry, vol. 31, No. 7, July, 1959, pp. 1284–1285.

Dietz et al.: "Application of Gas Chromatography to Petroleum Processes," Joint Symposium on Progress in Gas Chromatography, presented before the Division of Petroleum Chemistry, American Chemical Society, New York, September 8–13, 1957 (6 pp.).

Eckert, J. S.: "Design Techniques for Sizing Packed Towers," Chemical Engineering Progress, vol. 57, No. 9, September 1961, pp. 54–60.

U.S. Stoneware: "Intalox Saddle Packing," Bulletin S–29–R–1, The United States Stoneware Company, Akron, Ohio, 1957, 16 pp.

DeWett et al.: "Factors Affecting the Use of Gas-Liquid Chromatography for the Separation of Large Samples," Analytical Chemistry, vol. 32, No. 2, February 1960, pp. 169–174.

Frisone, G. J.: "The Design and Construction of a Two-Inch Preparative Gas Chromatographic Column," J. Chromatography, vol. 6, 1961, pp. 97–109.

Whelco Instruction Manual: Barber-Coleman Co., Whelco Instrument Division, Rockford, Illinois, Received in Patent Office March 7, 1961, pp. 5–9 and 28.

Nelson et al.: "Determination of Volatile Hydrocarbons in Aqueous Emulsions and Latexes by Gas Chromatography," Analytical Chemistry, vol. 33, No. 9, August 1961, pp. 1150–1153.

Dubusky et al.: "A Sampling Method For Solid Substances in High-Temperature Gas Chromatography up to 500," J. Chromatograph, vol. 4, 1960, pp. 1–5.

REUBEN FRIEDMAN, *Primary Examiner.*

UNITED STATES PATENT OFFICE
CERTIFICATE OF CORRECTION

Patent No. 3,225,520            December 28, 1965

Frank H. Burow

It is hereby certified that error appears in the above numbered patent requiring correction and that the said Letters Patent should read as corrected below.

Column 7, line 27, for "value" read -- valve --; column 12, line 14, strike out "form substantially in the order in which they have been"; line 28, for "separation" read -- separating --; line 50, for "gradual" read -- gradually --; same column 12, line 72, for "separation" read -- separating --; column 14, line 33, for "vaporable" read -- vaporizable --; line 48, for "efflent" read -- effluent --; column 15, line 8, after "mixture" insert -- into --; line 16, for "volumn" read -- volume --.

Signed and sealed this 20th day of December 1966.

(SEAL)

Attest:

ERNEST W. SWIDER
Attesting Officer

EDWARD J. BRENNER
Commissioner of Patents